UNITED STATES PATENT OFFICE.

LEVEN S. GOODRICH, OF WARNER, TENNESSEE.

PROCESS OF MANUFACTURING CHARCOAL.

SPECIFICATION forming part of Letters Patent No. 345,131, dated July 6, 1886.

Application filed September 29, 1885. Serial No. 178,589. (No specimens.)

*To all whom it may concern:*

Be it known that I, LEVEN S. GOODRICH, of Warner, in the county of Hickman and State of Tennessee, have invented certain new and useful Improvements in the Manufacture of Charcoal, of which the following is a specification.

The object of my invention is to provide a process by means of which wood can be converted into charcoal by the purified flammable gases or other gases which are produced by the distillation of the same, with less destruction of wood than has heretofore been possible, even in processes where these gaseous products have been used for a similar purpose; and this being the first of a series of applications which I intend to make in relation to this matter to secure patents therefor, and which will be hereinafter referred to, I deem it proper to describe the difficulties to be overcome in order to render my invention thoroughly understood.

In the first place, when any portion of the wood reaches the form of charcoal through destructive distillation, and remains at the point of ignition, in temperature it is in condition to combine with the oxygen of either air or water, or of both, if present, and form compounds at the expense of the charcoal. In the first instance impure nitrogen is set free, and in the second place impure hydrogen, the impurity in both cases being principally of carbon dioxide, ($CO_2$.) It is therefore essential to the success of charcoal-making to prevent as much as possible the admission of either air or water in the form of steam or aqueous vapor to a kiln of any kind used for the said manufacture. In the second place, a necessary provision in the manufacture of charcoal is to provide for extinguishing the fire of a kiln as soon as the process of charcoal-making is complete. In the next place, before beginning the manufacture of charcoal it is necessary for the best results to so construct a kiln as to admit of the regulation of the gases leading to and from the said kiln, according to their temperature, their nature, and the purpose for which they are used or rejected; and in order to make this very plain, so as to enable others using my invention to understand the objects of each successive step therein, I will proceed to describe the nature of these gases and their important bearing on the attending circumstances.

In this process there are three distinct characters of gas, or three gases handled as a body, which possess as a whole dissimilar characteristics. The first enters the kiln in a hot state, to carry on the work of destructive distillation. The second is that which leaves the kiln, and is composed of that which entered and which is produced as the product of distillation. This second gas, composed and mixed as stated, is, during certain stages of the process, capable of undergoing condensation and purification to such an extent as to leave a large portion thereof in a state of combustibility, and which, if mixed with air or oxygen in proper proportions, may be ignited and freely burned. In my apparatus the whole product of this combustion is made to enter the kiln under the name of the first gas under notice. When air, however, is used, the nitrogen present will eventually render the gas unfit to burn, as hereinafter explained, and must, therefore, be got rid of. This constitutes the third gas, and which has become so rich in nitrogen, from the air supplied to support this repeated combustion, that it can no longer be used, as, in the first place, this gas will neither support combustion nor yield itself to any simple purifying agent, and, as above stated, must be got rid of before the process can be practically continued under this gas-rotation system. This rejected gas is the agent, therefore, to be secured for extinguishing the fire in the kiln where the process of making charcoal is complete. Moreover, when this gas is taken off directly from the kiln before purification, it contains the carbonic dioxide, due from the combustion of the purified gases in the furnace, which is made to enter the kiln, and therefore at this stage of the process it is an advantage, instead of a detriment, as it provides a gas for extinguishing fire which would otherwise have to be generated through some of the known processes, dependent upon acids and reagents, some of which are expensive and handled with trouble. It will therefore be readily observed that in my process there is produced just what is needed at each stage thereof to make charcoal and preserve it after being made, providing the necessary apparatus is at hand to carry out the said process. I will now, therefore, be compelled to refer in this case to various specific devices described and shown in other applications relating to this process, and which will be marked "Case B," "Case C," "Case D," &c.

In Case C, I show a furnace which allows the gases produced in another stage of the process to enter the kiln through passages controlled by dampers, so as to direct the flow to various portions of the kiln which is filled with wood, to be raised in temperature by these heated gases to the points of destructive distillation.

In Case B, I show a kiln wherein the bottom is provided with an incline floor, whereby the liquid matter from the condensation of various portions of the products of distillation is allowed to flow to the main depository through a pipe sealed at the end with the liquid, to prevent the return of the gaseous product which passes off through another pipe to the said main, and which is similarly sealed for a similar purpose. In this case there is also provided an escape for the non-flammable gas to a holder for future use in the extinguishing of fire in the kiln, as hereinafter more fully described.

In Case D, I show a revolving purifying-chamber, into which the gas from the main passes before it returns to the kiln through the furnace shown in Case C. This purifying-chamber is supplied with lime and water or other suitable agent, and is provided with apparatus for agitating the said agent, which is fed into and discharged from the said chamber in the manner described in said Case C, so that the gas is subjected to a thorough bathing with the said purifying agent, whereby the carbon dioxide ($Co_2$) and other diluant gases, except nitrogen, are absorbed, leaving the gas in an inflammable condition until after repeated rotation of the same through the kiln and furnace renders it unfit for use, as hereinbefore stated, by the overcharge of nitrogen. Now, therefore, in Case B, as will be seen, provision is made for arresting this gas, and for conveying it off to a holder, where it is secured until wanted for extinguishing the fire in the charcoal of the kiln, which takes place through the heat from the inflowing heated gas from the furnace, and maintained in ignition from the oxygen present from the several principal sources herein named: First, from imperfect combustion of the gas in the furnace; second, from the air stored in the crevices of the wood as piled in the kiln; third, from aqueous vapors present during the process, and from the air naturally held in the wood and in the moisture present.

It will of course be seen that in my kiln (Case B) I rid the process of a great abundance of fluids, which condense, and which are not allowed to re-evaporate, to be decomposed, in great part, by the heated charcoal; hence, as for each sixteen tons of oxygen it requires twelve tons of carbon for its conversion into carbon monoxide, (Co,) it must be seen that I effect here a great saving. Besides, the heat otherwise required for this unnecessary evaporation is utilized in the distillation of the wood. These and other liquids from condensation, either here or in condensers provided for that purpose, which will be provided in this process, (like those used in others,) are utilized for the production of valuable compounds therein contained; and it may here be stated that I will also use an exhauster or fan for moving the gas to the holder, the same as is done in ordinary gas-works, so as to produce the pressure desired on the gas from the said holders to the furnace and kiln.

My process for the manufacture of charcoal therefore consists, first, in providing for a kiln two outer passages controlled so as to direct the escape of gaseous product therefrom in either of two directions named, the first being to a holder after passing suitable purifying and condensing apparatus for flammable purposes, and the second being to conduct the said product to a holder or receiver, to be used for extinguishing the fire in the kiln when the process of charcoal-making has been carried far enough; and for this purpose I provide a pipe leading from said holder to the same kiln, or to any other kiln or pit, wherein it may be used accordingly, and by these means, in the process of charcoal-making, I produce a flammable gas from the distillation sufficient to carry on destructive distillation within the kiln, and also a non-inflammable gas for extinguishing fire, as stated, and during the act of transferring this non-inflammable gas to its holder or receiver the process of distillation within the kiln is kept up by the surplus of flammable gas stored in the holder or receiver designed for that purpose, as shown in Case C.

I am aware that it has heretofore been proposed to extinguish the fire and cool the kiln in charcoal-making by passing non-inflammable gases through the kiln, the said gases being introduced at or near the bottom and drawn out at the top of the kiln. This differs from my invention, in that the drawing of the gases from the kiln has a tendency to create a vacuum, which, if the kiln be not absolutely air-tight, will permit air to be forced in. My object is to exclude the air entirely, and this I effect by introducing the gases under pressure greater than that of the atmosphere, and maintaining such pressure until the kiln shall have been sufficiently cooled.

What I here claim, and desire to secure by Letters Patent, is—

In charcoal-making, the process which consists in arresting and storing the non-inflammable gases resulting from the carbonizing process, and at the completion of the latter returning said gases to the kiln under pressure greater than that of the external atmosphere, and maintaining such pressure within the kiln until the cooling of the latter is effected, substantially as and for the purposes above described.

In testimony whereof I hereunto set my hand in presence of two witnesses.

LEVEN S. GOODRICH.

Witnesses:
W. H. CRAWFORD,
H. B. COOPER.